April 24, 1951 — E. G. ADAMS — 2,550,033
DIAL FOR GAUGES
Filed March 27, 1950
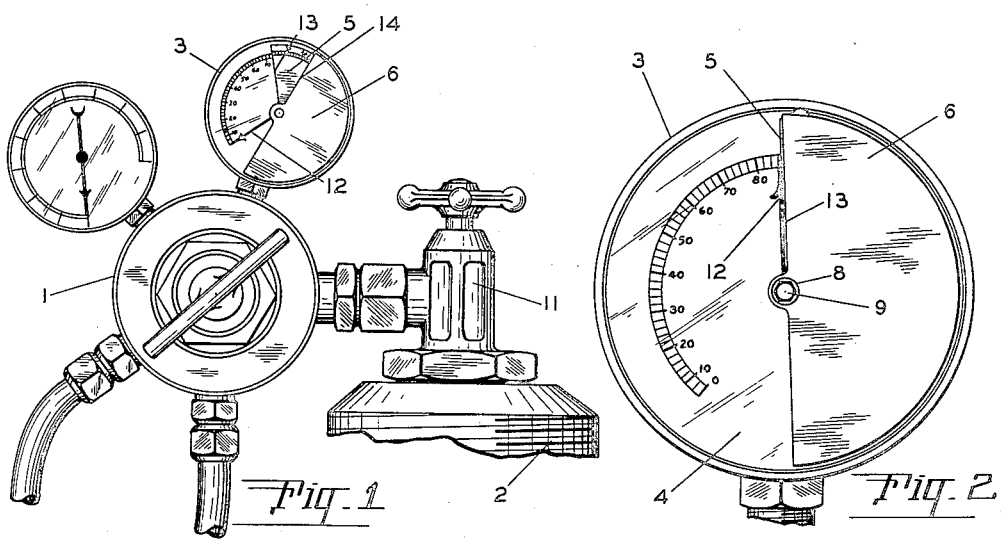
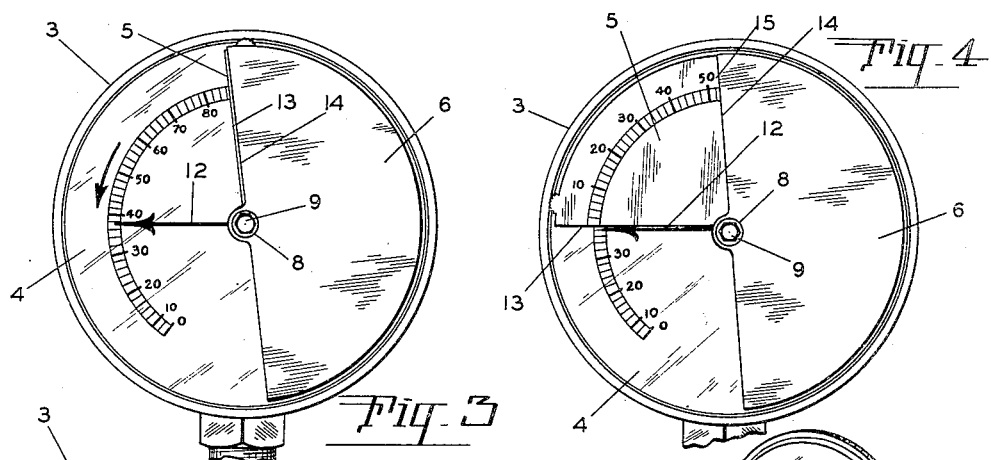
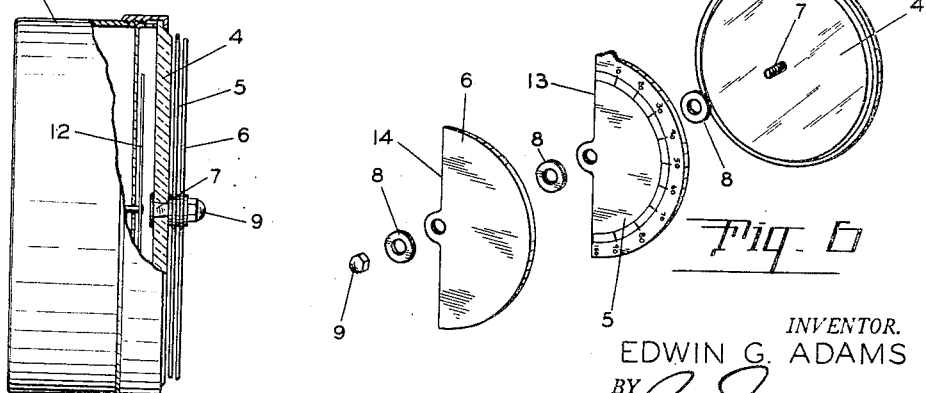
INVENTOR.
EDWIN G. ADAMS
BY
ATTY.

Patented Apr. 24, 1951

2,550,033

UNITED STATES PATENT OFFICE 2,550,033

DIAL FOR GAUGES

Edwin G. Adams, The Dalles, Oreg.

Application March 27, 1950, Serial No. 152,083

1 Claim. (Cl. 116—133)

This invention relates to dials for gauges and is particularly adapted to be used in connection with acetylene gas gauges.

The primary object of this invention is to provide an auxiliary dial to be used in connection with gauges to determine the amount of acetylene gas or other material consumed on each individual job being performed.

In the use of acetylene gas for welding, the welder heretofore had to calculate and note the reading of the hand on the dial before beginning a job, and then subtract the amount indicated on the dial after the job to determine the amount of gas used.

With my new and improved auxiliary dial he sets the same with the indicating hand on the gauge on starting a job. After the gauge hand travels to a lowered pressure, due to the use of the gas, the welder need only move the auxiliary dial to the new position of the hand and read directly therefrom the amount of gas consumed. Therefore he need not remember the previous reading which saves him considerable time, and at the same time eliminates chances of error in reading.

A further object of my invention is to provide an auxiliary dial for indicating the amount of material used on a single operation, said auxiliary dial being easy to install to any standard gauge by simply removing the present dial glass and replacing with my auxiliary dial unit.

These and other incidental objects will be apparent in the drawings, specification and claim.

Referring to the drawings:

Figure 1 is a control valve and its associated gauges mounted to a fragmentary portion of a gas tank having my new and improved auxiliary dial mounted thereon.

Figure 2 is a view of the gauge and dial after the valve has been opened applying pressure within the valve, bringing the hand to the position shown and as having my dial adjusted to the position of the hand.

Figure 3 is the same as Figure 2, except that the pressure has lowered within the tank, bringing the indicating hand to the lower pressure position.

Figure 4 is the same as Figures 2 and 3, except that my auxiliary gauge has been moved to the new position of the indicating hand making it possible to read the amount of material having been used.

Figure 5 is a side view of a gauge, partially broken away for convenience of illustration, and having my new and improved auxiliary dial unit mounted thereon.

Figure 6 is an exploded view of the elements making up my new and improved auxiliary dial.

Referring more specifically to the drawings:

In Figure 1 I have illustrated an acetylene valve and gauge assembly 1 mounted to a fragmentary portion of an acetylene tank 2. My invention consists of removing the present glass front from the gauge 3 and replacing the same with my auxiliary gauge unit, consisting of the transparent gauge glass 4, an auxiliary dial 5 and shutter 6.

My auxiliary gauge dial 5 and the shutter 6 are pivotally mounted to the face of the gauge glass 4 by the spindle 7, which is secured to the center of the gauge glass 4, best illustrated in Figures 5 and 6. Suitable washers 8 are disposed between the glass 4, dial 5 and shutter 6 for spacing them apart so that they will operate smoothly. These washers preferably should be made from a compressible material so that when the nut 9 is threaded on to the spindle 7 there will be sufficient friction between the glass 4, dial 5 and shutter 6 to hold the said dial and shutter in an adjusted position.

I will now describe the operation of my new and improved auxiliary dial for gauges. Referring to Figure 1, the valve 11 of the gauge assembly 1 is in closed position, there being no acetylene reaching the gauge 3 to the acetylene nozzle, said nozzle not here being shown. The usual indicator hand 12 of the gauge 3 is located on zero. The auxiliary dial 5 and the shutter 6 having not yet been adjusted by the operator.

Figure 2 illustrates the position of the pointer hand 12 when the valve 11 is opened permitting gas to enter the valve and gauge assembly 1. This is the pressure contained within the tank 2. The operator then lines up the edge 13 of the auxiliary gauge 5 with the hand 12, together with the edge 14 of the shutter 6.

As the operator uses the torch, the hand 12 travels in the direction of the arrow as the pressure in the tank 2 is reduced. We will assume that it stops in the position indicated in Figure 3. The operator then moves the auxiliary dial 5 to the position shown in Figure 4 adjacent the hand 12, and as this dial is uncovered from under the shutter 6 he can read the amount of material as indicated at 15 that has been used, thereby saving him considerable time and giving him an accurate reading without having to remember the previous reading before he started the particular job in question, which he sometimes would forget causing loss to either the customer or himself.

I have illustrated a shutter 6, but I would not wish to be limited to a shutter, as an auxiliary hand or bar would answer the same purpose, but a shutter gives a more satisfactory result due to the fact that it eliminates having to read any great portion of the gauge dial.

I have described my invention as having to do with pressures, but I do not wish to be limited to this particular reading, as any form of gauge reading is adapted to my new and improved auxiliary dial.

Summing up the primary object of my invention is to mark the position of the gauge indicating hand at the beginning of using material on a job by my auxiliary gauge. When the indicating hand stops at a new position after the job is complete, my auxiliary dial can be lined up with the said hand, and a direct reading of the amount of material used can be read from my auxiliary dial.

Although certain specific embodiments of the invention have been shown and described, it is obvious that many modifications thereof are possible. The invention, therefore, it not to be restricted except in so far as is necessitated by the prior art and by the spirit of the appended claim.

What I claim is:

In combination a gauge comprising a casing, a pivotally mounted indicating pointer mounted in the casing, a scale in the casing with which the pointer cooperates to indicate values, a transparent front plate mounted in the front of the casing over the pointer and scale, a pivot on the front transparent plate in line with the pivot of the pointer, a semi-circular scale plate mounted on the pivot on the transparent front plate to extend over the scale in the casing when rotated on its pivot, a scale on the semi-circular scale plate to cooperate with the scale in the casing when said scale plate is rotated, and a semi-circular shield mounted on the pivot on the transparent plate, whereby the scale on the semi-circular scale plate may be covered after taking a reading between the two scales.

EDWIN G. ADAMS.

REFERENCES CITED

The following references are of record in the file of this patent:

UNITED STATES PATENTS

| Number | Name | Date |
| --- | --- | --- |
| 1,755,106 | Eckardt | Apr. 15, 1930 |
| 1,888,298 | Teesdale | Nov. 22, 1932 |
| 2,123,395 | Antrim | July 12, 1938 |